(12) United States Patent
Kim et al.

(10) Patent No.: US 7,450,611 B2
(45) Date of Patent: Nov. 11, 2008

(54) APPARATUS AND METHOD FOR TRANSMITTING AND RECEIVING TBS INFORMATION IN AN HSDPA COMMUNICATION SYSTEM

(75) Inventors: Sung-Hoon Kim, Seoul (KR); Kook-Heui Lee, Songnam-shi (KR); Ju-Ho Lee, Suwon-shi (KR); Sung-Ho Choi, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1210 days.

(21) Appl. No.: 10/266,106

(22) Filed: Oct. 7, 2002

(65) Prior Publication Data
US 2003/0074476 A1 Apr. 17, 2003

(30) Foreign Application Priority Data
Oct. 5, 2001 (KR) ............ 10-2001-0061543

(51) Int. Cl.
*H04J 3/16* (2006.01)
*H04J 3/22* (2006.01)

(52) U.S. Cl. .............. 370/471; 370/473; 370/474; 370/476; 370/572; 375/295

(58) Field of Classification Search .......... 370/389, 370/312, 235, 217, 394, 206, 207, 329, 468, 370/477, 478, 432, 471, 473, 474, 476, 572; 375/295; 709/246
See application file for complete search history.

(56) References Cited

U.S. PATENT DOCUMENTS

| | | | |
|---|---|---|---|
| 7,206,332 B2 * | 4/2007 | Kwan et al. ......... 375/140 |
| 2003/0081692 A1 * | 5/2003 | Kwan et al. ......... 375/295 |
| 2005/0063347 A1 * | 3/2005 | Sarkkinen et al. .... 370/338 |
| 2006/0251099 A1 * | 11/2006 | Kim et al. ........... 370/432 |
| 2006/0256807 A1 * | 11/2006 | Jung et al. .......... 370/432 |

* cited by examiner

*Primary Examiner*—Seema S. Rao
*Assistant Examiner*—Leon Andrews
(74) *Attorney, Agent, or Firm*—The Farrell Law Firm, PC

(57) ABSTRACT

An HSDPA (High Speed Downlink Packet Access) communication system is disclosed. A Node B reduces a size of a field transmitting TBS (Transport Block Set) information for user data based on an MCS (Modulation and Coding Scheme) level assigned to the user data and the number of codes assigned to the user data, before transmission, instead of transmitting an intact size of the actually transmitted transport block for the user data, among TFRI (Transport Format Resource Information) transmitted to a UE (User Equipment) over a shared control channel.

17 Claims, 13 Drawing Sheets

CONVENTIONAL METHOD

1ST EMBODIMENT

2ND EMBODIMENT

3RD EMBODIMENT

CONVENTIONAL METHOD

1ST EMBODIMENT

2ND EMBODIMENT

3RD EMBODIMENT

APPARATUS AND METHOD FOR TRANSMITTING AND RECEIVING TBS INFORMATION IN AN HSDPA COMMUNICATION SYSTEM

PRIORITY

This application claims priority to an application entitled "Apparatus and Method for Transmitting and Receiving TBS Information in an HSDPA Communication System" filed in the Korean Industrial Property Office on Oct. 5, 2001 and assigned Serial No. 2001-61543, the contents of which are incorporated herein by reference.

BACKGROUND OF THE INVENTION

1. Field of the Invention

The present invention relates generally to an HSDPA (High Speed Downlink Packet Access) communication system, and in particular, to an apparatus and method for transmitting TBS (Transport Block Set) size information for user data.

2. Description of the Related Art

In general, HSDPA refers to a scheme for transmitting data using HS-DSCH (High Speed-Downlink Shared Channel), a downlink data channel for supporting high-speed downlink packet transmission, and its associated control channels in a UMTS (Universal Mobile Telecommunication System) communication system. AMC (Adaptive Modulation and Coding), HARQ (Hybrid Automatic Retransmission Request), and FCS (Fast Cell Selection) schemes have been proposed in order to support the HSDPA. The AMC, HARQ and FCS schemes will be described herein below.

First, a description of the AMC will be made. The AMC is a data transmission scheme for adaptively determining a modulation scheme and a coding scheme of a data channel according to a channel condition between a specific Node B and a UE (User Equipment), thus to increase the overall utilization efficiency of the Node B. Therefore, the AMC supports a plurality of modulation schemes and coding schemes, and modulates and codes a data channel signal by combining the modulation schemes and the coding schemes. Commonly, each combination of the modulation schemes and the coding schemes is called "MCS (Modulation and Coding Scheme)," and there are defined a plurality of MCS levels of #1 to #n according to the number of the MCSs. That is, the AMC adaptively determines an MCS level according to a channel condition of a UE and a Node B to which the UE is wirelessly connected, thereby increasing the entire utilization efficiency of the Node B.

Next, a description will be made of the FCS. The FCS is a scheme for fast selecting a cell having the best channel condition among a plurality of cells, when a UE supporting the HSDPA (hereinafter referred to as "HSDPA UE") is located in a cell overlapping region, or a soft handover region. Specifically, in the FCS, if an HSDPA UE enters a cell overlapping region between a first Node B and a second Node B, the HSDPA UE establishes radio links to a plurality of cells, i.e., the first Node B and the second Node B. Here, a set of the cells to which the HSDPA UE has established the radio links is called an "active set." The UE reduces overall interference by receiving HSDPA packet data only from the cell maintaining the best channel condition among the cells included in the active set. Here, a cell in the active set, which transmits HSDPA packet data due to its best channel condition, is called a "best cell," and the HSDPA UE periodically checks channel conditions of the cells in the active set and transmits a best cell indicator to the cells belonging to the active set in order to replace the current best cell with a new best cell having the better channel condition. The best cell indicator includes a cell ID of a cell selected as a best cell, and the cells in the active set receive the best cell indicator and detect the cell ID included in the best cell indicator. Each of the cells in the active set determines whether the received best cell indicator includes its own cell ID. As a result of the determination, if the best cell indicator includes its own cell ID, the corresponding cell transmits packet data to the HSDPA UE over HS_DSCH.

Finally, a description will be made of the HARQ, especially n-channel SAW HARQ (Stop and Wait Hybrid Automatic Retransmission Request). The HARQ newly proposes the following two plans in order to increase transmission efficiency of the existing ARQ (Automatic Retransmission Request). First, a retransmission request and a response are exchanged between a UE and a Node B. Second, defective data is temporarily stored, and combined with retransmitted data of the corresponding data. Further, the HSDPA has introduced the n-channel SAW HARQ in order to make up for a shortcoming of the conventional SAW ARQ. The SAW ARQ does not transmit the next packet data until it receives ACK for the previous packet data. Therefore, in some cases, the SAW ARQ must await ACK, although it can currently transmit the next packet data. However, in the n-channel SAW HARQ, the next packet data is continuously transmitted before ACK for the previous packet data is received, thereby increasing utilization efficiency of channels. That is, if n logical channels are established between a UE and a Node B, and the n logical channels can be identified by time and unique channel numbers, then the UE can recognize a channel over which packet data was received, and rearrange the received packets in the right reception order, or soft-combine the received packets.

In a communication system supporting the HSDPA (hereinafter, referred to as HSDPA communication system) which increases communication efficiency by supporting AMC, FCS and HARQ, a plurality of UEs share some of downlink transmission resources. The downlink transmission resources include transmission power and OVSF (Orthogonal Variable Spreading Factor) codes (or orthogonal codes). The HSDPA communication system uses 10 OVSF codes for SF (Spreading Factor=16, and 20 OVSF codes for SF=32.

In the HSDPA communication system, a plurality of UEs can simultaneously use a plurality of available OVSF codes at a specific time. That is, in the HSDPA communication system, it is possible to enable OVSF code multiplexing among a plurality of UEs at a specific time. The OVSF code multiplexing will be described with reference to FIG. 1.

FIG. 1 illustrates an exemplary method of assigning OVSF codes in a general HSDPA communication system. A description of FIG. 1 will be made for SF=16.

Referring to FIG. 1, OVSF codes are defines as C(i,j) according to the positions of a code tree. In an OVSF code C(i,j), 'i' denotes the SF value and 'j' denotes the order of the corresponding OVSF code from the leftmost side in the OVSF code tree. For example, C(16,0) indicates an OVSF code with SF=16 located in the first place from the leftmost side in the OVSF code tree. In FIG. 1, for example, 10 OVSF codes of a $7^{th}$ OVSF code C(16,6) to a $16^{th}$ OVSF code C(16,15) are assigned to the HSDPA communication system. The 10 OVSF codes can be multiplexed to a plurality of UEs, as illustrated in Table 1.

TABLE 1

| | Time | | |
|---|---|---|---|
| User | t0 | t1 | t2 |
| A | C(16,6)~C(16,7) | C(16,6)~C(16,8) | C(16,6)~C(16,10) |
| B | C(16,8)~C(16,10) | C(16,9)~C(16,10) | C(16,11)~C(16,14) |
| C | C(16,11)~C(16,15) | C(16,11)~C(16,15) | C(16,15) |

In Table 1, A, B and C denote users (or UEs), which are using the HSDPA communication system. As illustrated in Table 1, the users A, B and C perform code multiplexing on the OVSF codes assigned to the HSDPA communication system at timing points t0, t1 and t2. The number of OVSF codes to be assigned to the UEs and their positions on the OVSF code tree are determined by the Node B, and the Node B determines the number of OVSF codes and their positions taking into consideration an amount of user data for each UE stored in the Node B.

The HSDPA communication system proposes that such control information as the OVSF code information should be transmitted to UEs over downlink control channels. For better understanding, reference will be made to a channel structure for the HSDPA communication system.

The HSDPA communication system includes high-speed downlink shared channels (HS-DSCH), downlink control channels and uplink control channels. The high-speed downlink shared channel transmits user data to UEs using OVSF codes assigned to the HSDPA communication system. In order to support the AMC, HARQ and FCS schemes newly introduced to support the HSDPA communication system, it is necessary to exchange control information between the Node B and the UE, and the control information is transmitted over the downlink control channel and the uplink control channel. The control information transmitted over the uplink control channel includes (i) channel quality information (CQI) periodically reported to the Node B by the UE, (ii) an ACK (Acknowledgement) signal used by the UE to report whether received user data is defective, and (iii) best cell information used by the UE to report a cell providing the best channel condition by comparing channel conditions of the cells within its coverage.

In addition, control information transmitted over the downlink control channel includes (i) HI (HS-DSCH Indicator) indicating to a UE that user data will be transmitted over a high-speed downlink shared channel, (ii) MCS level information, (iii) TBS (Transport Block Set) size information, (iv) OVSF code information to be assigned to the corresponding UE, (v) HARQ information, and (vi) CRC (Cyclic Redundancy Check) information. Of the control information transmitted over the downlink control channel, the sum of the MCS level information, the TBS size information and the OVSF code information is called "TFRI (Transport Format Resource Information)."

The control information stated above is transmitted over two control channels of an associated DPCH (dedicated physical channel) and a SCCH (shared control channel). The "associated dedicated physical channel" means a dedicated physical channel established between a UE and a Node B, both supporting the HSDPA communication, on a one-to-one basis, and the dedicated physical channel transmits the HI. The HI indicates whether HSDPA service data will be transmitted to a UE over a high-speed downlink shared channel in the near future. If the HSDPA service data is transmitted to the UE, the HI indicates a shared control channel over which the UE should receive the concerned control information, among a plurality of shared control channels used in the HSDPA communication system. For example, in the case where 4 shared control channels exist in the HSDPA communication system, if the 4 shared control channels are assigned unique integers 0 to 3 and the HI is comprised of 2 bits, then (1) non-transmission of the HI means that there exists no HSDPA service data to be transmitted to the corresponding UE, (2) HI=0(00) indicates that control information for the HSDPA service data should be received over a shared control channel #0, (3) HI=1(01) indicates that control information for the HSDPA service data should be received over a shared control channel #1, (4) HI=2(10) indicates that control information for the HSDPA service data should be received over a shared control channel #2, and (5) HI=3(11) indicates that control information for the HSDPA service data should be received over a shared control channel #3.

The shared control channel transmits the remaining control information except the HI, and a structure of the shared control channel will be described with reference to FIG. 2.

FIG. 2 illustrates a structure of a shared control channel in a common HSDPA communication system. Referring to FIG. 2, the shared control channel has a 2 ms period comprised of 3 slots. The reason that the shared control channel transmits a signal at a period of 2 ms is because a data transmission unit over the high-speed downlink shared channel is 3 slots. For example, the ongoing standardization session proposes that one of the 3 slots which become the data transmission unit of the high-speed downlink shared channel transmits the HARQ information, and the remaining 2 slots transmit the TFRI and the CRC, respectively. If the UE detects an HI field filled with information while continuously monitoring the HI field on an associated dedicated physical channel established between the UE and the Node B, the UE reads information on a corresponding shared control channel designated by the HI information and receives a high-speed downlink shared channel corresponding to the information read from the corresponding shared control channel.

In the HSDPA communication system, information needed to properly process data received by a physical layer of the UE includes TB (Transport Block) size information, TBS size information, channel coding information, modulation information, rate matching information, and code information. On the information stated above, the channel coding information and the modulation information are transmitted from the Node B to the UE through MCS level information, while the code information is transmitted from the Node B to the UE through OVSF code information. In addition, a size of the transport block is determined during initial call setup, and the size of the transport block remains unchanged (i.e., fixed size) while the call is maintained, so it is not necessary to separately transmit information on the size of the transport block from the Node B to the UE.

Further, the TBS size information indicates the number of transport blocks transmitted for a single TTI (Transmission Time Interval), and the rate matching information indicates a repetition or puncturing technique performed on user data by a physical layer of the Node B performs repetition or puncturing. The TBS size information is transmitted over the TFRI field illustrated in FIG. 2, and the rate matching information is not transmitted separately, because the rate matching technique is determined depending on the TBS size.

Next, a structure of a physical layer for a transmitter in the HSDPA communication system will be described with reference to FIG. 3.

FIG. 3 illustrates a channel structure of a physical layer for a transmitter in a common HSDPA communication system. Referring to FIG. 3, transport blocks to be transmitted are transmitted from an upper layer to a physical layer, i.e., over a transport channel. The transport blocks transmitted from the upper layer undergo concatenation or segmentation according to their size. For example, in FIG. 3, the transport blocks transmitted from the upper layer undergo concatenation (Step 301). Here, the transport blocks are transmitted from the upper layer to the physical layer for each TTI. The transport blocks transmitted in the TTI unit constitute a transport block set, and the number of transport blocks transmitted over the transport block set becomes a size of the transport block set. Header information is attached to the transport blocks, or the transport block set transmitted from the upper layer (Header Attachment) (Step 302). The header information may include such information as serial numbers that can be used for sequentially arranging the transport blocks in the transport block set at a receiver corresponding to the transmitter. CRC is attached to the header information-attached transport block set (Step 303). Here, for the CRC, a 24-bit CRC operation can be considered.

The CRC-attached transport block set is segmented into code blocks with a size proper for channel coding for error correcting codes (Step 304), and then subject to channel coding for channel transmission (Step 305). Here, the channel-coded data is called a "coded block." After the code block segmentation, i.e., at a point D4, information bits constituting the transport blocks are converted into a symbol at a point D5 through the channel coding. The coded block undergoes rate matching taking into consideration a length of a physical layer frame and a spreading factor in order to actually transmit the coded block to the physical layer (Step 306). That is, the rate matching is a process of matching a size of the coded block to an amount of information that can be actually transmitted over the physical channel. For example, if the number of symbols output through the channel coding is D5 and the number of symbols finally transmitted over the physical channel is D9, then the number of symbols after the rate matching is matched to D9. That is, for the rate matching, puncturing is performed for D5>D9 and repetition is performed for D9>D5, thus to match the number of symbols at a point D5 to the number of symbols at a point D9.

The rate-matched data is segmented in a unit that can be transmitted over a physical channel (Physical Channel Segmentation) (Step 307). The physical channel segmentation is performed to segment the whole data in a size proper for each code, since a high-speed downlink shared channel can be comprised of a plurality of codes. The physical channel-segmented data is interleaved in order to prevent a burst error (Step 308), and the interleaved data is finally mapped to a physical channel and then transmitted over the physical channel (Physical Channel Mapping) (Step 309).

An amount of user data to be transmitted is changed as follows, as the user data passes through the processes illustrated in FIG. 3.

D1=TB_Size (size of transport block)*TBS$_{13}$ Size (size of transport block set)

D2=D1+Header_Size (size of header)

D3=D2+CRC (e.g., 24 bits)

D4=D3

D5=D4*1/CR (where CR denotes a coding rate)

D6=D5+RM (size of rate matching)

D7=D6

D8=D7

D9=D8={(TB_Size*TBS_Size+Header_Size+CRC)/CR+RM}

Further, in FIG. 3, a transmission unit of the user data is changed as follows, as the user data passes through the processes illustrated in FIG. 3. The transmission unit becomes an IB (information bit) unit at D1 to D4, a symbol unit at D5 to D8, and a MS (modulated symbol) unit at D9. That is, the information bits are converted to a symbol through channel coding, and the symbol is converted to a modulated symbol through modulation.

Since the D9 means the total sum of data actually transmitted over the physical channel, it can be expressed as $$D9=NC*Code\_capa=NC*[((chip\ rate\ per\ time\ slot)/SF)*(number\ of\ time\ slots\ per\ TTI)*MO)]=NC*MO*480\ (3\ time\ slots)*2560\ (chip\ rate\ per\ time\ slot)/16(SF)$$ Equation (1)

In Equation (1), NC denotes the number of codes, Code_capa denotes an amount of data that can be transmitted by one code, SF denotes a spreading factor, and MO denotes a modulation order. Further, in Equation (1), a unit of the data amount becomes a symbol unit, Equation (1) can be rewritten as Equation (2). Here, it is assumed that SF=16.

$$[TB\_Size*TBS+Header\_Size+CRC]/CR+RM=NC*480*MO$$ Equation (2)

Further, Equation (2) can be written as $$RM=NC*480*MO-[TB\_Size*TBS\_Header\_Size-CRC]/CR$$ Equation (3)

In Equation (3), if repetition is performed for rate matching, the parameter RM becomes a positive number, and if puncturing is performed for rate matching, the parameter RM becomes a negative value.

A data amount in each process of FIG. 3 will be described with reference to FIG. 4.

FIG. 4 illustrates an amount of data in each process in the channel structure of the physical layer of FIG. 3. Before a description of FIG. 4, it should be noted that an amount of data finally transmitted over a physical channel is D9 as described in conjunction with FIG. 3, and the D9 is defined by a Node B at a certain timing point. That is, the D9 is determined based on the number of codes assigned to a given UE at a certain timing point and an MCS level. The transport block size TB_Size, the CRC size and the header size Header_Size are also constants which are not changed while the corresponding call is maintained. However, the transport block set size TBS_Size is a variable which is changed according to an amount of data for the UE, stored in the Node B. In other words, in Equations (1) to (3), parameters which are changed for each TTI include TBS (Transport Block Set), NC (Number of Codes), MO (Modulation Order), and CR (Coding Rate). These parameters are transmitted from the Node B to the UE for each TTI over a TFRI field on the shared control channel.

Referring to FIG. 4, when transport blocks are transmitted from an upper layer, the transport blocks undergo transport block concatenation according to their sizes as illustrated in conjunction with FIG. 3, and an amount of the concatenated transport blocks becomes D1. When header and CRC are attached to the concatenated transport blocks, an amount of the header/CRC-attached transport blocks becomes D3. When the header/CRC-attached information bits undergo code block segmentation and channel coding, an amount of the channel-coded data becomes D5. When D5 symbols are rate matched, an amount of the rate-matched data becomes D6. When D6 symbols are subject to physical channel segmentation, an amount of the segmented data becomes D7. Here, D6 is equal to D7 in a data amount, but rate-matched symbols are segmented according to an amount of the physical channel. In FIG. 4, it is assumed that repetition is performed for the rate matching.

A rate matching process by the physical layer structure of FIG. 3 will be described with reference to FIGS. 5A and 5B.

FIGS. 5A and 5B illustrate a common rate matching technique. Referring to FIGS. 5A and 5B, if a Node B, or a transmitter determines a rate matching technique, then the physical layer channel structure of FIG. 3 repeats or punctures coded blocks represented by D5 at regular intervals according to the rate matching technique, and transmits the rate-matched coded blocks to a UE, or a receiver after channel processing. The receiver then inserts 0's in the punctured portion (0 Insertion) if the rate matching value (or parameter) is a negative value, i.e., if the coded blocks underwent puncturing, in order to match a size of the coded blocks to D5, and then provides the 0-inserted coded blocks to a channel decoder.

In contrast, if the rate matching value is a positive number, i.e., if the coded blocks underwent repetition, the receiver sums up the repeated bits in order to match a size of the coded blocks to D5, and provides the rate-matched coded blocks to the channel decoder. That is, the receiver secures correct channel decoding, when it recognizes a rate matching value transmitted by the transmitter. Further, in the HSDPA communication system, information on the transport block set (TBS), the number of codes (NC) and the coding rate (CR) is reported from a Node B to a UE for each TTI, thus to enable the Node B and the UE to calculate the same rate matching value. Although the UE can correctly determine the number (or TBS size) of transport blocks transmitted from the Node B by calculating the rate matching value, the Node B transmits to the UE the TBS size information for each TTI, i.e., transmits the downlink control information unnecessarily, causing an unnecessary waste of downlink channel resources.

SUMMARY OF THE INVENTION

It is, therefore, an object of the present invention to provide an apparatus and method for transmitting and receiving TBS size information for user data in an HSDPA communication system.

It is another object of the present invention to provide an apparatus and method for reducing a size of control information transmitted over a shared control channel in an HSDPA communication system.

It is further another object of the present invention to provide an apparatus and method for detecting a TBS size using a rate matching value in an HSDPA communication system.

To achieve the above and other objects, the present invention provides a method for transmitting TBS (Transport Block Set) information to a UE (User Equipment) in a high-speed packet communication system. The method comprises the steps of determining at least one Modulation order among a plurality of modulation orders and at least one code among a plurality of codes, determining the number of radio frame data bits based on the determined modulation order and the number of the determined codes, comparing the number of coded bits for a user data with the number of radio frame data bits, setting a flag indicating a repetition if the number of coded bits for a user data is less than the number of radio frame data bits, setting a flag indicating a puncturing if the number of coded bits for a user data is greater than the number of radio frame data bits; and transmitting the TBS information including the flag.

To achieve the above and other objects, the present invention provides a method for transmitting TBS (Transport Block Set) information to a UE (User Equipment). The method comprises the steps of determining at least one modulation order among a plurality of modulation orders and at least one code among a plurality of codes, determining a first number of information bits that can be transmitted with the determined modulation order and the number of the determined codes, determining a second number of information bits that can be transmitted with the determined modulation order and the number of the determined codes minus one and determining a third number of transport blocks that can be transmitted with the first number of information bits, determining a fourth number of transport blocks that can be transmitted with the second number of information bits, and then transmitting a difference between the third number of transport blocks and the fourth number of transport blocks.

To achieve the above and other objects, the present invention provides a method for receiving TBS (Transport Block Set) information in a high-speed packet communication system in which a Node B separates transmission information bits into a plurality of transport blocks each having a first number of bits, transmits a TBS including a stream of the transport blocks and transmits information on the TBS to a UE (User Equipment) without transmitting TBS size information indicating the number of the transport blocks. The method comprises the steps of receiving over a downlink shared channel an modulation order assigned to the TBS, the number of codes assigned to the TBS, and a repetition/puncturing flag indicating whether the TBS underwent repetition or puncturing, determining a second number of information bits that can be transmitted with the assigned modulation order and the number of the assigned codes, calculating a third number of transport blocks by rounding up a valued determined by dividing the second number of information bits by the first number of bits, and calculating a fourth number of transport blocks by rounding down a value determined by dividing the second number of information bits by the first number of bits, if the received repetition/puncturing flag indicates that the TBS underwent repetition, determining the size of the TBS as the third number of transport blocks, and determining a rate matching value by subtracting a product of the third number of transport blocks and the first number of bits from the second number of information bits, and if the received repetition/puncturing flag indicates that the TBS underwent puncturing, determining the size of the TBS as the fourth number of transport blocks, and determining a rate matching value by subtracting a product of the fourth number of transport blocks and the first number of bits from the second number of information bits.

To achieve the above and other objects, the present invention provides an apparatus for transmitting TBS (Transport Block Set) information to a UE (User Equipment) without transmitting TBS size information indicating the number of transport blocks in a high-speed packet communication system which separates transmission information bits into a plurality of transport blocks each having a given number of bits and transmits a TBS including a stream of the transport blocks. The apparatus comprising comprises an MCS (Modulation and Coding Scheme) level controller for assigning one MCS level among a plurality of MCS levels according to channel quality information received from the UE, a code assigner for assigning at least one code among a plurality of codes according to the number of the transmission information bits, a rate matching controller for determining the number of transmittable information bits based on the determined MCS level and the number of the determined codes, and a transmitter for transmitting the assigned MCS level, the number of the assigned codes, and the repetition flag or the puncturing flag, over a downlink, wherein if the number of coded bits for the transmission information bits is less than the number of transmittable information bits, repeating some of the coded bits at regular intervals and assigning a repetition flag indicting the repetition, and if the number of coded bits is greater than or equal to the number of transmittable information bits, puncturing some of the coded bits at regular intervals and assigning a puncturing flag indicting the puncturing.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Before a description of the present invention, the following should be noted. In an HSDPA (High Speed Downlink Packet Access) communication system, a Node B determines scheduling, code assignment and MCS (Modulation and Coding Scheme) level for user data to be transmitted to a UE (User Equipment). The scheduling is closed related to the number of transport blocks (TBs) to be transmitted to a UE at a certain timing point, while the code assignment and the MCS level are closely related to an amount of data to be transmitted to the UE at the corresponding timing point. This will be described with reference to FIG. 3. The scheduling is related to an amount of data, or information bits of transport blocks transmitted from D1, or an upper layer, and the number of assigned codes and the assigned MCS level are related to an amount, D9, of data actually transmitted over a physical channel. That is, the Node B determines the MCS level and the code assignment taking into consideration a channel condition at a corresponding timing point and an amount of data to be transmitted to other UEs, i.e., determines an amount, D9, of data to be transmitted to the corresponding UE. Further, the Node B determines the number, D1, of transport blocks in accordance with the determined data amount D9. Therefore, a size of transport block set (TBS), i.e., the number of transport blocks transmitted becomes a dependent variable which depends upon a capacity of the physical channel at the corresponding timing point.

Figure 3:
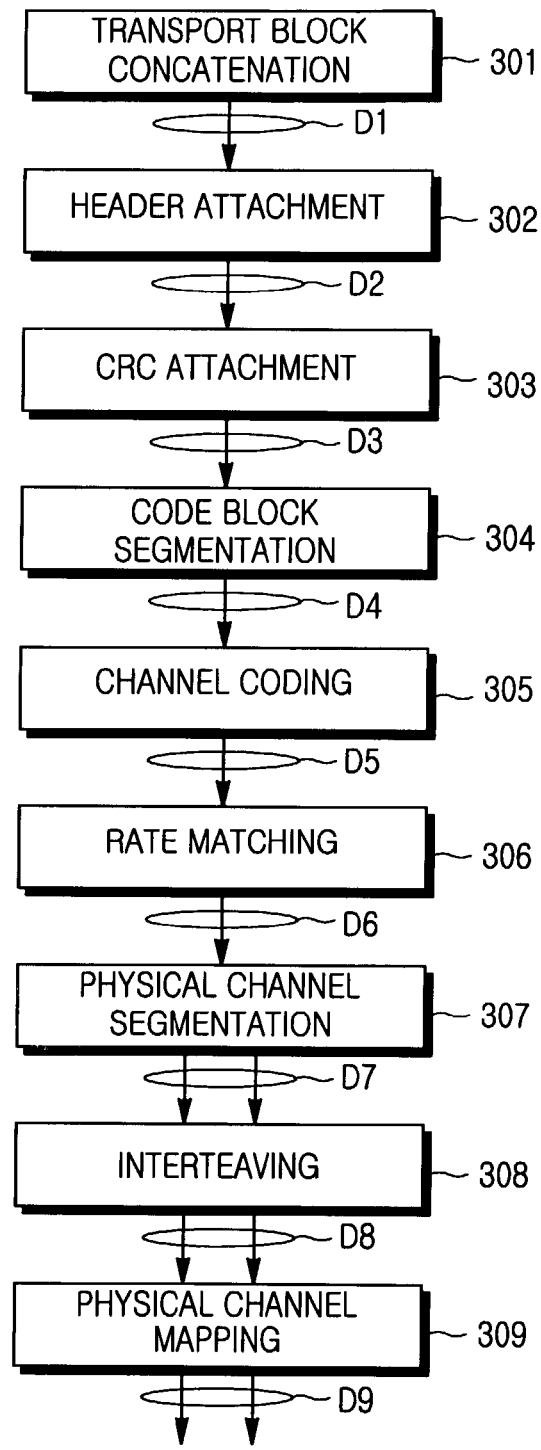
FIG. 3 illustrates a channel structure of a physical layer for a transmitter in a common HSDPA communication system.
Figure 4:
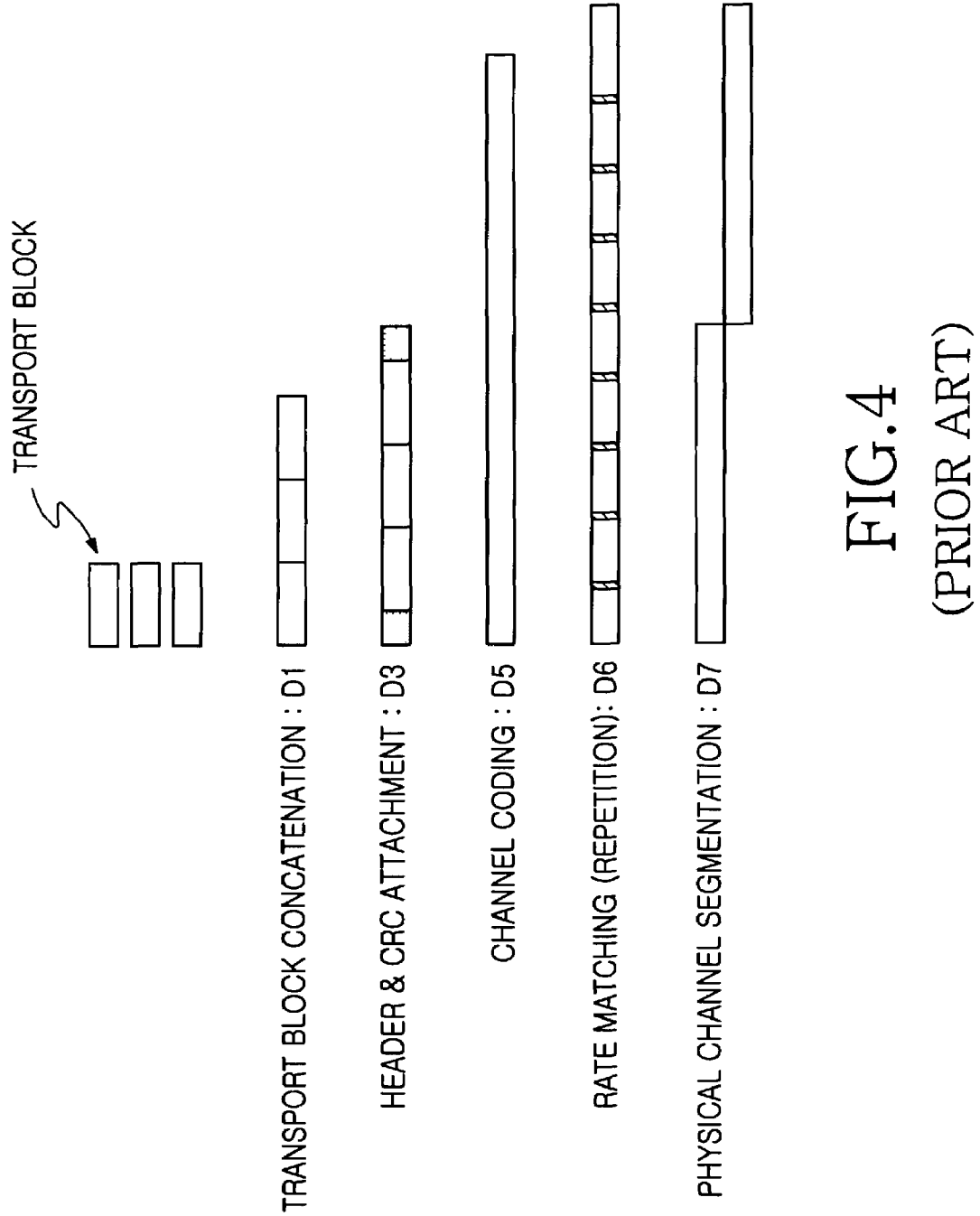
FIG. 4 illustrates a size of data in each process in the channel structure of the physical layer of FIG. 3.
Figure 5A:
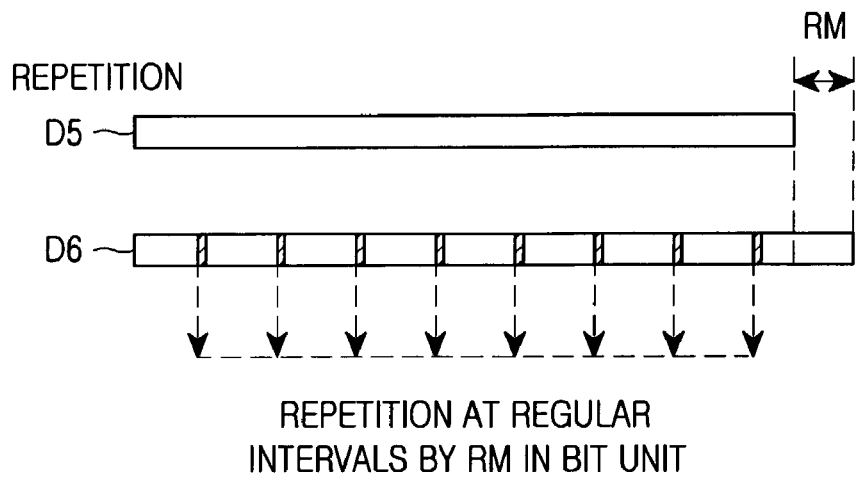
FIGS. 5A and 5B illustrate a common rate matching technique.
Figure 5B:
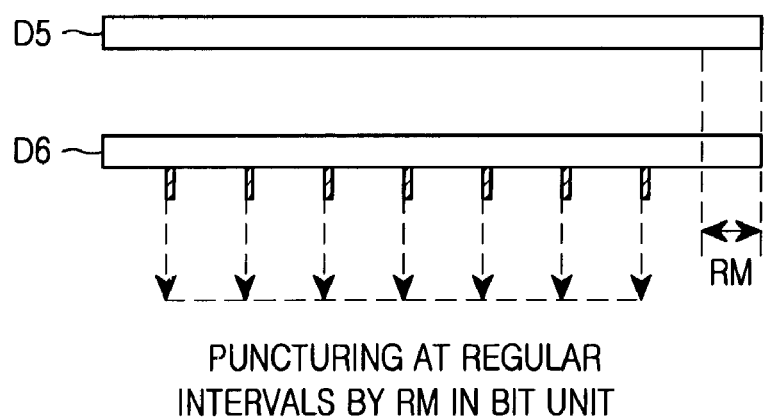

As described in conjunction with FIG. 3, the capacity, D9, of the physical channel is defined as $$D9 = NC*480*MO \qquad \text{Equation (4)}$$

In Equation (4), NC denotes the number of codes, and MO denotes a modulation order. Equation (4) is calculated in a symbol unit.

Further, the capacity of the physical channel can be expressed in terms of information bits, as follows.

$$P\_CAPA = NC*480*MO*CR \qquad \text{Equation (5)}$$

In Equation (5), P_CAPA denotes the capacity of the physical channel expressed in terms of information bits. The MO and CR (Coding Rate) are determined based on the MCS level, and the NC is determined based on the entire traffic size at a corresponding timing point. As a result, P_CAPA becomes a time-varying function which is changed from the maximum capacity to the minimum capacity. However, from the viewpoint of the Node B, the P_CAPA at a certain timing point means a quantity of transmission resources that can be used by the Node B at the corresponding timing point, so it is necessary to match as many transport blocks as possible to the P_CAPA in order to efficiently use the transmission resources. Therefore, a transport block set (TBS), i.e., the number of transport blocks transmitted for one TTI (Transport Time Interval) is matched to the P_CAPA as shown in Equation (6).

$$TBS\_\text{estimated} = (P\_CAPA - CRC(\text{Cyclic Redundancy Check}) - \text{Header}_{Size})/TB\_Size \qquad \text{Equation (6)}$$

TBS_1 = RU(TBS_estimated)

TBS_2 = RD(TBS_estimated)

In Equation (6), RU denotes rounding up and RD denotes rounding down.

The Node B selects TBS_1 or TBS_2 as a transport block set (TBS) for the corresponding timing point.

In addition, the P_CAPA is a time-varying function, and their maximum value P_CAPA_MAX and minimum value P_CAPA_MIN are defined as $$P\_CAPA\_MIN = NC\_MIN*480*MO\_MIN*CR\_MIN$$

$$P\_CAPA\_MAX = NC\_MAX*480*MO\_MAX*\text{i} \\ CR\_MAX \qquad \text{Equation (7)}$$

In Equation (7), NC_MIN denotes the minimum number of codes that can be assigned by the Node B, and NC_MAX denotes the maximum number of codes that can be assigned by the Node B. Further, MO_MIN denotes the minimum modulation order applicable to the Node B, and MO_MAX denotes the maximum modulation order applicable to the Node B. In addition, CR_MIN denotes the minimum coding rate applicable to the Node B, and CR_MAX denotes the maximum coding rate applicable to the Node B. Since the product of MO and CR is matched to the MCS level on a one-to-one basis, Equation (7) can be rewritten as $$P\_CAPA\_MIN = NC\_MIN * 480 * MCS\_1$$

$$P\_CAPA\_MAX = NC\_MAX * 480 * MCS\_MAX \quad \text{Equation (8)}$$

In Equation (8), MCS_1 denotes the product of MO and CR for an MCS level 1, and MCS_MAX denotes the product of MO and CR for the maximum MCS level. Therefore, the minimum number, TBS_MIN, of transport blocks that can be transmitted for one TTI becomes 1, and the maximum number, TBS_MAX, of transport blocks that can be transmitted for one TTI can be derived from P_CAPA_MAX of Equation (8). That is, TBS_MAX estimate=(P_CAPA_MAX−CRC−Header_Size)/TB_Size, so the maximum size of a transport block set to be actually transmitted becomes TBS_MAX=RU (TBS_MAX_estimated).

Therefore, the conventional SCCH (Shared Control Channel) structure for the HSDPA communication system includes information on the TBS_MIN and the TBS_MAX. That is, a TBS field indicating size information of a transport block set with a size RU[log2(TBS_MAX−1] must be included in TFRI (Transport Format Resource Information), thus using a large quantity of the shared control channel resource.

Accordingly, the present invention proposes a method for reducing a size of the TBS information transmitting the TBS size information in the TFRI field in order to reduce an amount of data transmitted over the shared control channel, thereby increasing utilization efficiency of the downlink shared channel resource.

The method for reducing a size of the TBS field will be described with reference to three different embodiments.

(1) First Embodiment

The first embodiment of the present invention reduces a size of the TBS field based on the fact that a size of the TBS field is always matched to the P_CAPA on a one-to-one basis except for a special case.

As stated above, a Node B determines the TBS size, or an amount of the user data to be transmitted to a given UE at a certain timing point, and at the same time, determines an MCS level and code assignment at the corresponding timing point. That is, at a certain timing point, the Node B first determines P_CAPA and then determines its associated TBS in accordance with Equation (6). As illustrated in Equation (6), TBS matched to a certain P_CAPA includes TBS_1 and TBS_2. The TBS_1 corresponds to a case where puncturing is performed for rate matching, and the TBS_2 corresponds to a case where repetition is performed for rate matching. The Node B calculates TBS_1 and TBS_2 for the corresponding P_CAPA using Equation (6), and then selects the calculated TBS_1 or TBS_2 as TBS for the corresponding timing point. After determining the TBS, the Node B performs rate matching in accordance with the determined TBS, and then informs the UE whether a rate matching type for the TBS is puncturing or repetition. Then, the UE can calculate TBS from the P_CAPA and determine a rate matching value RM based on the calculated TBS. In conclusion, since the Node B is simply required to inform the UE whether the rate matching type is puncturing or repetition using flag, instead of personally transmitting the TBS value, the UE is allowed to assign only one bit to the TBS field in the TFRI field. For example, if the rate matching type performed on the TBS is puncturing, the UE sets the TBS field to '0' before transmission, and if rate matching type performed on the TBS is repetition, the UE sets the TBS field to '1' before transmission.

In the first embodiment of the present invention, a TBS size to be transmitted to a corresponding UE at a certain timing point is valid when it is larger than or equal to TBS_2 at the corresponding timing point. However, when the TBS size TBS_actual to be actually transmitted to the corresponding UE at the certain timing point is less than TBS_2, the transport blocks are repeated up to TBS_2 to match the TBS_2 to the TBS_actual. Further, since the transport block is matched to RLC-PDU (Radio Link Control-Protocol Data Unit) on a one-to-one basis and the RLC-PDU is assigned a serial number for repetition check, the repetition performed in a transport block unit does not affect the system operation.

Now, a channel structure of a physical layer for a transmitter in an HSDPA communication system according to a first embodiment of the present invention will be described with reference to FIG. 6.

Figure 6:
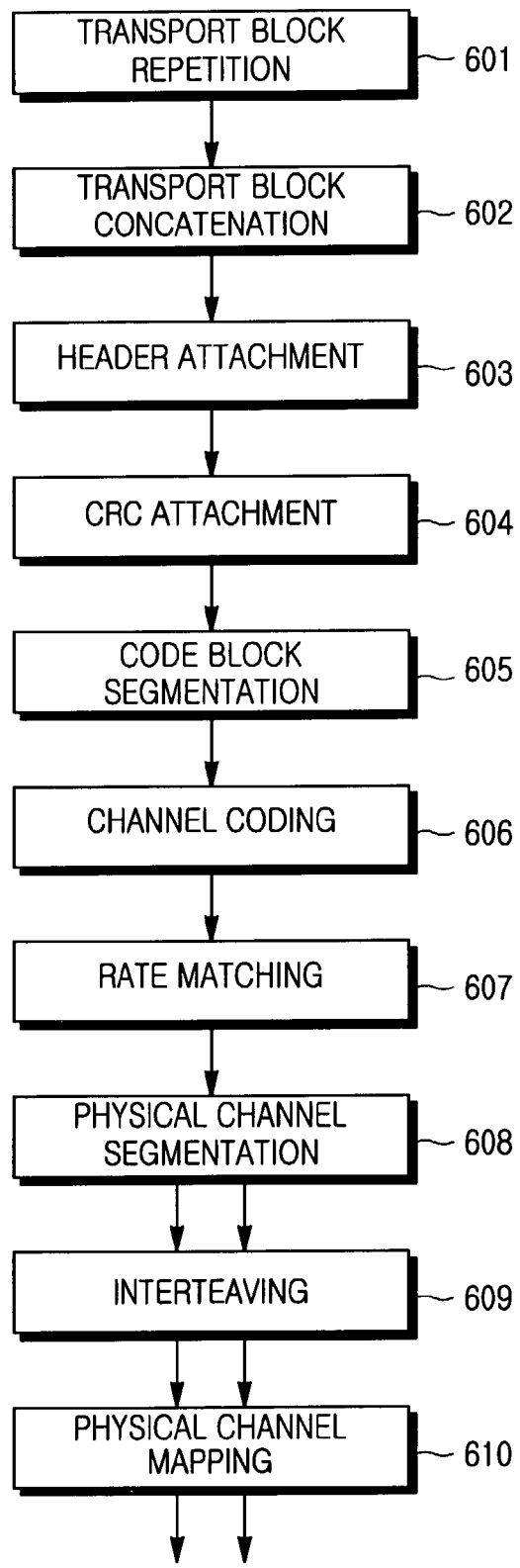
FIG. 6 illustrates a channel structure of a physical layer for a transmitter in an HSDPA communication system according to a first embodiment of the present invention.

FIG. 6 illustrates a channel structure of a physical layer for a transmitter in an HSDPA communication system according to a first embodiment of the present invention. The channel structure of FIG. 6 is identical to the general channel structure of FIG. 3 except step 601. That is, steps 602 to 610 of FIG. 6 are equivalent to steps 301 to 309 of FIG. 3, respectively. An operation in step 601 will be described. If a TBS size TBS_actual to be actually transmitted is smaller than the TBS_2, the Node B performs repetition on the transport blocks in order to match the TBS_actual to the TBS_2 (TrBlock Repetition). For example, if TBS_2=5 and TBS_actual=2, the Node B repeats the 2 transport blocks thus to generate 5 transport blocks.

The transport block repetition operation performed in step 601 by the transmitter will be described with reference to FIG. 7.

Figure 7:
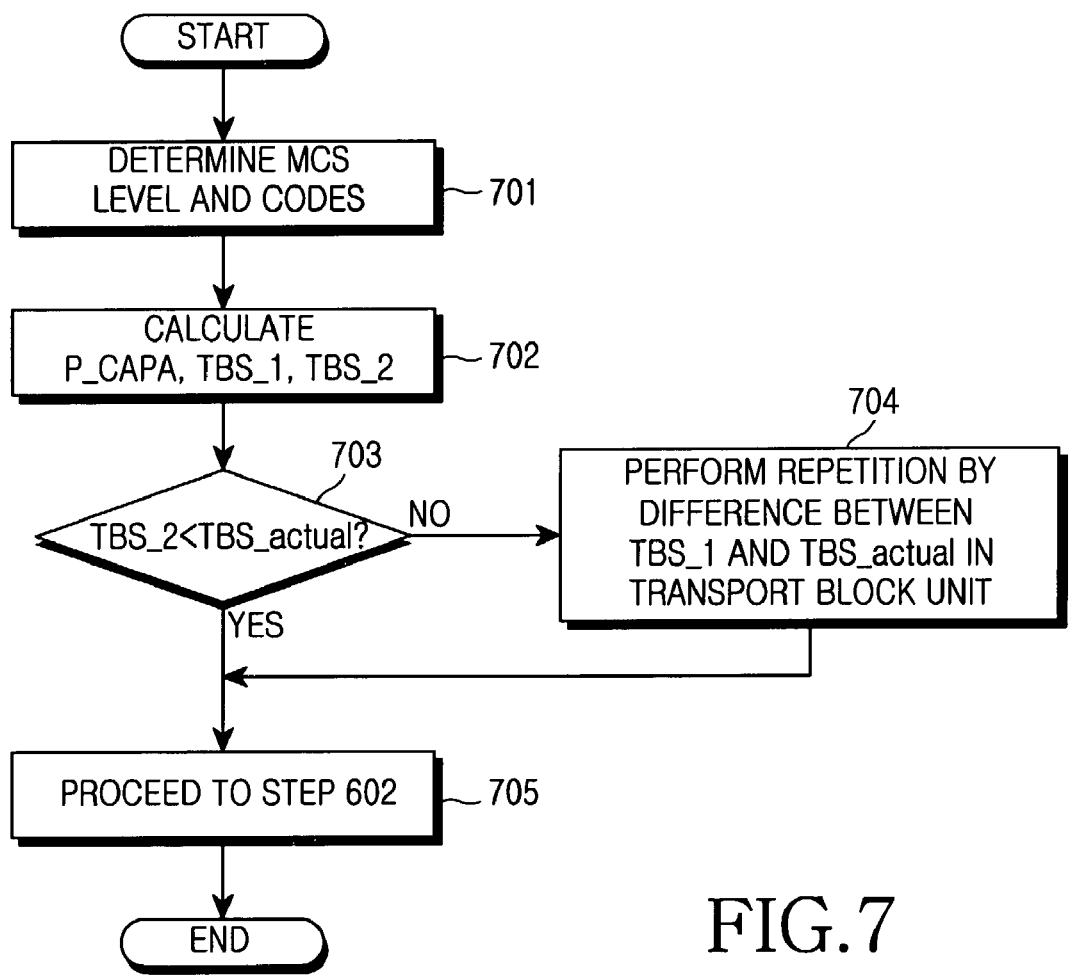
FIG. 7 is a flow chart illustrating an operating process of a transmitter according to a first embodiment of the present invention.

FIG. 7 is a flow chart illustrating an operating process of a transmitter according to a first embodiment of the present invention. Referring to FIG. 7, in step 701, a Node B determines the number of codes to be assigned and an MCS level, and then proceeds to step 702. In step 702, the Node B calculates P_CAPA, TBS_1 and TBS_2 using the determined number of codes and the determined MCS level, and then proceeds to step 703. In step 703, the Node B determines a correlation between the number, TBS_actual, of transport blocks to be transmitted to a corresponding UE and the calculated TBS_2, and determines whether TBS_actual is larger than TBS_2. As a result of the determination, if the TBS_actual is smaller than or equal to the TBS_2, the Node B proceeds to step 704. In step 704, the Node B repeats the TBS_actual transport blocks in order to match the number, TBS_2, of the transport blocks to the number, TBS_actual, of the transport blocks, and then ends the process. However, if the TBS_actual is larger than the TBS_2 in step 703, the Node B proceeds to step 705. In step 705, the Node B performs the channel handling process described in conjunction with of FIG. 6, beginning at the transport block concatenation process of step 602.

So far, the first embodiment of the present invention has been described with reference to FIGS. 6 and 7. Next, a method for reducing a size of the TBS field according to a second embodiment of the present will be described.

(2) Second Embodiment

The second embodiment of the present invention reduces a size of the TBS field based on the MCS level and the TBS_actual without performing repetition in a transport block unit.

As described before, the P_CAPA is a function of the number of assigned codes and the MCS level. If the number of codes is defined as 1~NC_MAX, the MCS level is defined as MCS_1~MCS_MAX, and P_CAPA corresponding to NC_j and MCS_k is defined as P_CAPA(NC_j, MCS_k), then a range of P_CAPA(NC_j, MCS_k) becomes P_CAPA(1, MCS_1)~P_CAPA(NC_MAX, MCS_MAX), as illustrated in Equation (9).

$$P\_CAPA(1, MCS\_1) = MCS\_1 * 480$$

$$P\_CAPA(1, MCS\_2) = MCS\_2 * 480$$

$$P\_CAPA(2, MCS\_n) = MCS\_n * 480 * 2$$

$$P\_CAPA(NC\_MAX, MCS\_MAX) = MCS\_MAX * 480 * NC\_MAX \quad \text{Equation (9)}$$

In Equation (9), if a portion corresponding to an actual transport block in the P_CAPA is defined as P_ACAPA, the P_ACAPA can be represented by $$P\_ACAPA(1, MCS\_1) = MCS\_1 * 480 - CRC\text{-Header\_Size}$$

$$P\_ACAPA(1, MCS\_2) = MCS\_2 * 480 - CRC\text{-Header\_Size}$$

$$P\_ACAPA(2, MCS\_n) = MCS\_n * 480 * 2 - CRC\text{-Header\_Size}$$

$$P\_ACAPA(NC\_MAX, MCS\_MAX) = MCS\_MAX * 480 * NC\_MAX - CRC\text{-Header\_Size} \quad \text{Equation (10)}$$

In the second embodiment of the present invention, the Node B and the UE determine the MCS level and the code assignment in accordance with Rule 1 to Rule 4 below.

Rule 1
A Node B and a UE set TB_Size to P_ACAPA(1,MCS_1)

Rule 2
After determining an MCS level and code assignment, a Node B calculates P_ACAPA according to. If the calculated P_ACAPA is larger than the product of TB_Size and TBS_actual, Rule 3 and Rule 4 are used. If, however, the calculated P_ACAPA is smaller than the product of TB_Size and TBS_actual, the assigned MCS level and codes are used.

Rule 3
The product of TBS_actual and TB_Size is set to P_ACAPA_target.

Rule 4
P_ACAPA most approximate to the P_ACAPA_target is determined, and an MCS level and codes are assigned according to the determined P_ACAPA.

Now, an operation of a transmitter according to a second embodiment of the present invention will be described with reference to FIG. 8.

Figure 8:
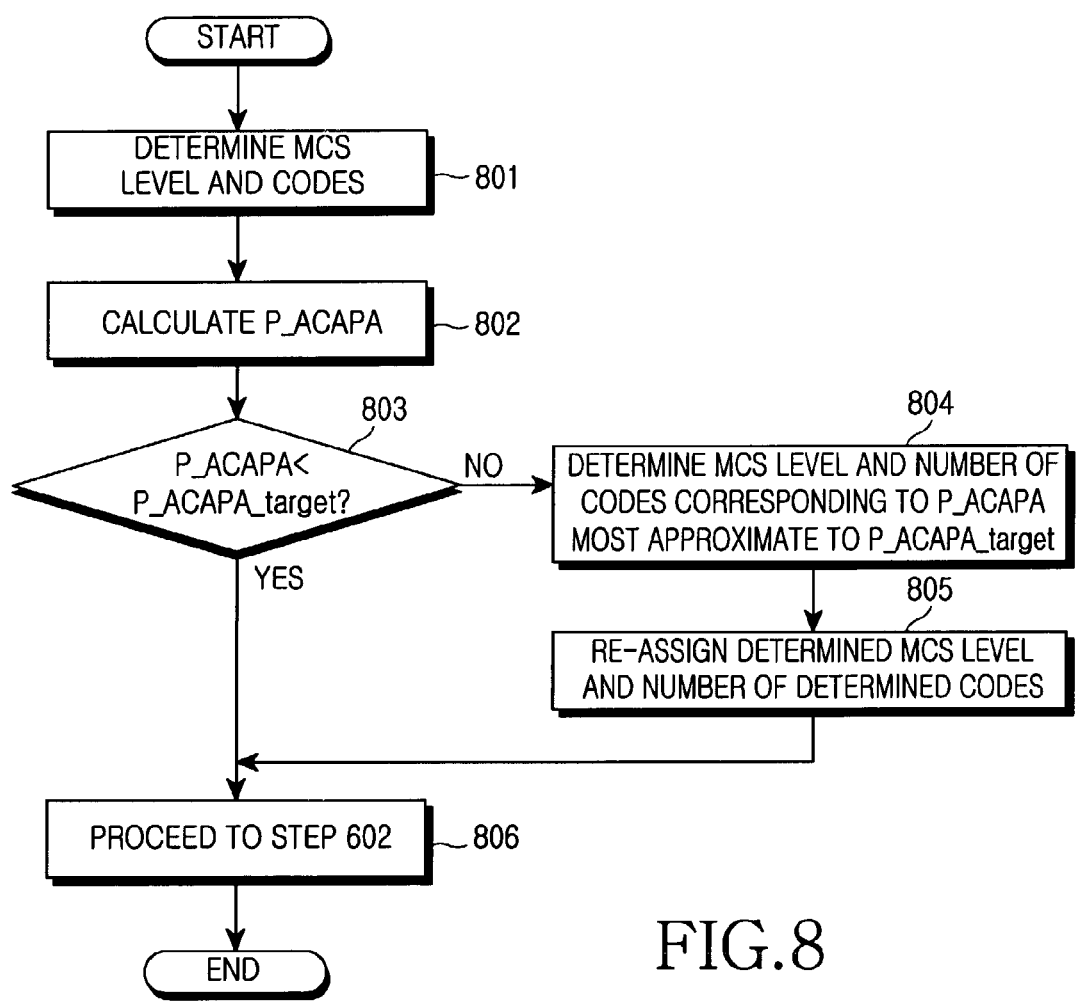
FIG. 8 is a flow chart illustrating an operating process of a transmitter according to a second embodiment of the present invention.

FIG. 8 is a flow chart illustrating an operating process of a transmitter according to a second embodiment of the present invention. Referring to FIG. 8, in step 801, a Node B determines the number of codes and an MCS level to be assigned to user data, and then proceeds to step 802. In step 802, the Node B calculates P_ACAPA based on the determined number of codes and the determined MCS level, and then proceeds to step 803. In step 803, the Node B determines whether the calculated P_ACAPA is smaller than P_ACAPA_target. As a result of the determination, if the calculated P_ACAPA is larger than or equal to P_ACAPA_target, the Node B proceeds to step 804. In step 804, the Node B determines the MCS level and the number of codes according to P_ACAPA most approximate to the P_ACAPA_target, and then proceeds to step 805. In step 805, the Node B reassigns the MCS level and the number of codes be assigned to the user data to the MCS level and the number of codes, determined in step 804, and then proceeds to step 806.

However, if the calculated P_ACAPA is smaller than P_ACAPA_target in step 803, the Node B proceeds to step 806. In step 806, the Node B performs the channel handling process described in conjunction with of FIG. 6, beginning at the transport block concatenation process of step 602.

Hitherto, the second embodiment of the present invention has been described with reference to FIG. 8. Next, a method for reducing a size of the TBS field according to a third embodiment of the present will be described.

(3) Third Embodiment

The third embodiment of the present invention reduces a size of the TBS field by matching TBS information to a logical value rather than an absolute value.

If a state in which N channelization codes are assigned to a given UE and an MCS level M is determined is defined as S(N,M), an HSDPA communication system has states of S(1, 1)~S(Code_MAX, MCS_MAX). Here, Code_MAX means the total number of channelization codes assignable to a high-speed downlink shared channel in the HSDPA communication system, and MCS_MAX means the highest MCS level assignable by the HSDPA communication system.

In general, a Node B determines an MCS level based on a channel quality between the Node B and a given UE, and determines the number of channelization codes based on an amount of data to be transmitted to the corresponding UE. For example, if it is assumed that a state of the given UE is S(X,Y), a correlation between the number, X, of codes and the number of transport blocks to be transmitted over a high-speed downlink shared channel is defined as $$TBS\_MAX\_WOF(X-1, Y) < TBS\_\text{variation}(X, Y) < TBS\_MAX(X, Y) \quad \text{Equation (11)}$$

In Equation (11), TBS_variation(X,Y) means a variation in TBS available in S(X,Y), and TBS_MAX(X,Y) means the maximum number of TBs that can be transmitted in S(X,Y), and its size is determined based on a permissible maximum puncturing value for rate matching. Here, the "permissible maximum puncturing value" means the maximum number of bits that can be punctured for rate matching. If the permissible maximum puncturing value is set to a high value, a transmission quality of user data is degraded but an amount of transmittable data is increased. In addition, TBS_MAX(X,Y) can be expressed as $$TBS\_MAX(X, Y) = (P\_ACAPA(X, Y) - RM\_MAX\_bit) / TB\_Size \quad \text{Equation (12)}$$

In Equation (12), if RM_MAX_bit is restricted to a value smaller than TB_Size, Equation (12) can be changed into Equation (13). Further, the RM_MAX_bit denotes the maximum RM value in terms of bit.

$$TBS\_MAX(X, Y) = RU[P\_ACAPA(X, Y) / TB\_Size] \quad \text{Equation (13)}$$

In Equation (13), TBS_MAX_WOF(X−1,Y) means the maximum number of transport blocks that can be transmitted in S(X−1,Y) without performing puncturing. This can be expressed as $$TBS\_MAX\_WOF(X-1, Y) = RD[P\_ACAPA(X-1, Y) / TB\_Size] \quad \text{Equation (14)}$$

Finally, the TBS_variation(X,Y) is expressed as $$RD[(P\_CAPA(X-1,Y)-CRC\text{-Header\_Size})/TB\_Size]$$
$$<TBS\_variation(X,Y) \leq RU[(P\_CAPA(X,Y)-$$
$$CRC\text{-Header\_Size})/TB\_Size] \quad \text{Equation (15)}$$

In Equation (15), $P\_CAPA(X,Y)=X*480*MCS\_Y$.

The values stated above will be described with reference to FIG. 9.

Figure 9:
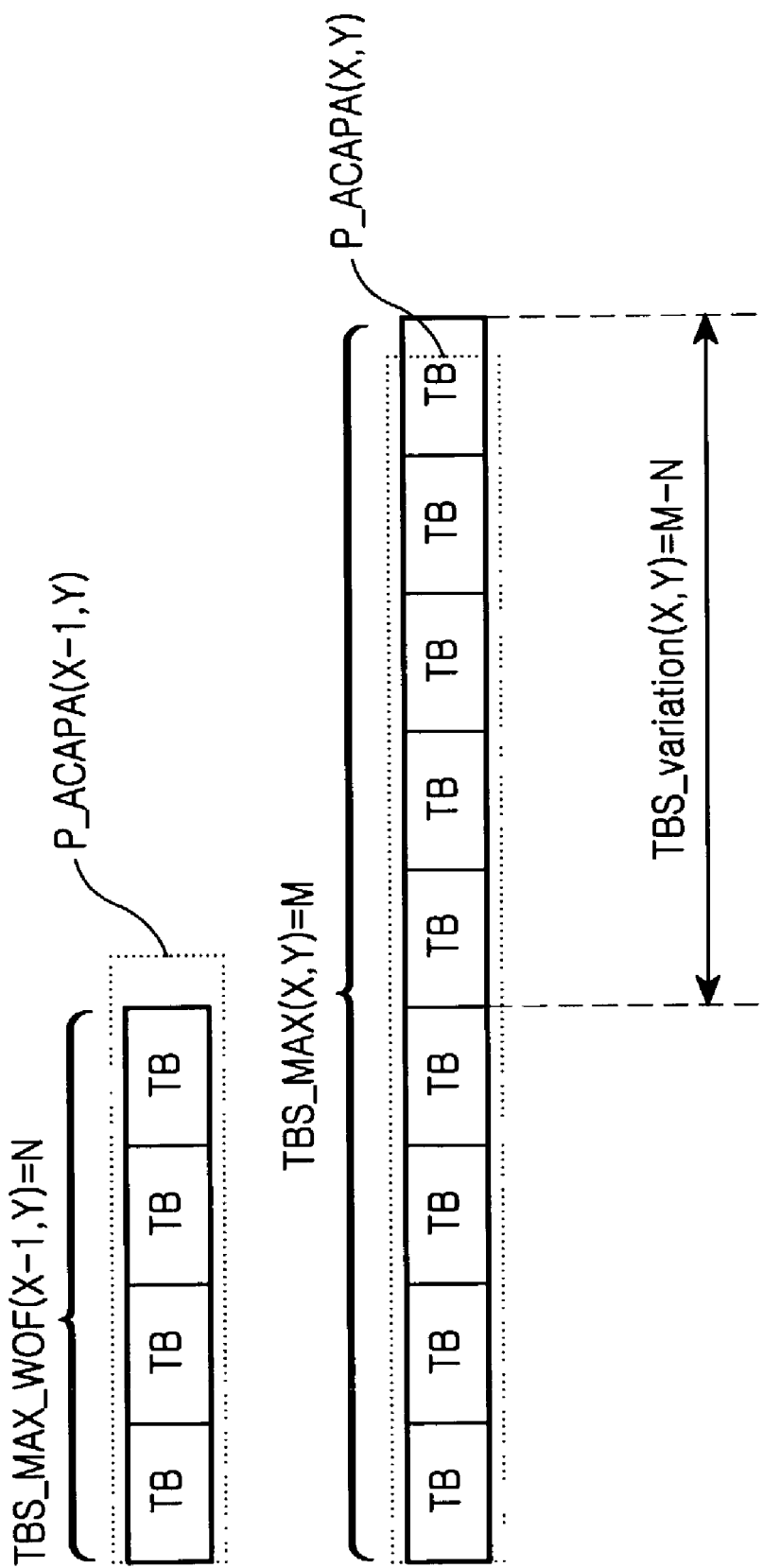
FIG. 9 illustrates a TBS variation TBS_variation(X,Y) available in a state where X codes are assigned and an MCS level Y is assigned, according to a third embodiment of the present invention.

FIG. 9 illustrates a TBS variation TBS_variation(X,Y) available in a state where X codes are assigned and an MCS level Y is assigned, according to a third embodiment of the present invention.

Referring to FIG. 9, a size of the TBS_variation(X,Y) is equal to a difference between TBS_MAX_WOF(X−1,Y) and TBS_MAX(X,Y). A Node B can reduce an amount of transmission information by transmitting only the relative difference from TBS_MAX_WOF at a corresponding timing point instead of transmitting an absolute TBS size before transmitting a high-speed downlink shared channel to a UE. For example, if TB_Size is 100 bits, the number of codes is 10, an MCS level n designates ½ turbo coding and 16 QAM (Quadrature Amplitude Modulation), a CRC size is 24 bits, Header_Size is 10 bits, and an RM size converted in terms of bit is 34 bits, then $$P\_CAPA(10,n)=480*10*½*4=9600 \text{ bits}$$

$$P\_ACAPA(10,n)=9600-24-10=9566 \text{ bits}$$

In this state, if it is assumed that 34-bit puncturing is used for rate matching, then the number of TBs becomes 96. In the conventional HSDPA communication system, 96 TBs must be transmitted using a TBS field. Thus, at least RU(log2(95)) or more bits must be assigned. However, according to the third embodiment, TBS_MAX_WOF(9,n)=RD[(P_ACAPA(X−1,Y))/TB_Size]=RD(8606/100)=86. Therefore, the Node B is allowed to simply transmit, to the UE, information on a difference, 10, between the number, 96, of actually transmitted TBs and TBS_MAX_WOF(9,n).

In the third embodiment of the present invention, since the number of bits that must be assigned to transmit a TBS size over a TFRI field on a shared control channel should be able to cover the maximum TBS_variation value, it can be expressed as $$TBS\_variation\_MAX=TBS\_variation(Code\_Max, MCS\_MAX)$$

$$TBS\_variation(Code\_Max, MCS\_MAX)=RU[P\_ACAPA(Code\_MAX, MCS\_MAX)/TB\_Size]-RD[P\_CAPA(Code\_MAX-1, MCS\_MAX)/TB\_Size]$$

$$Field\_Size\_TBS=log2[TBS\_Variation\_MAX] \text{ bits} \quad \text{Equation (16)}$$

In Equation (16), Field_Size_TBS means the number of bits that must be assigned to a TBS field.

The Node B substitutes a value of Equation (17) into a TBS field on a shared control channel in S(X,Y).

$$Value\_TBS=TBS\_actual-TBS\_MAX\_WOF(X-1,Y) \quad \text{Equation (17)}$$

In Equation (17), TBS_actual denotes the number of actually transmitted TBs, and Value_TBS means a value to be inserted into a TBS field by the Node B, i.e., a value determined by subtracting the number of actually transmitted TBs from the number of TBs that can be maximally transmitted.

If the Node B transmits the Value_TBS calculated from Equation (17) to a UE over a TFRI field, the UE calculates the number of actually transmitted TBs based on the received Value_TBS in accordance with Equation (18).

$$TBS\_actual=Value\_TBS+TBS\_MAX\_WOF(X-1,Y) \quad \text{Equation (18)}$$

Next, a structure of a transceiver according to first to third embodiments of the present invention will be described with reference to FIGS. 10 and 11.

Figure 10:
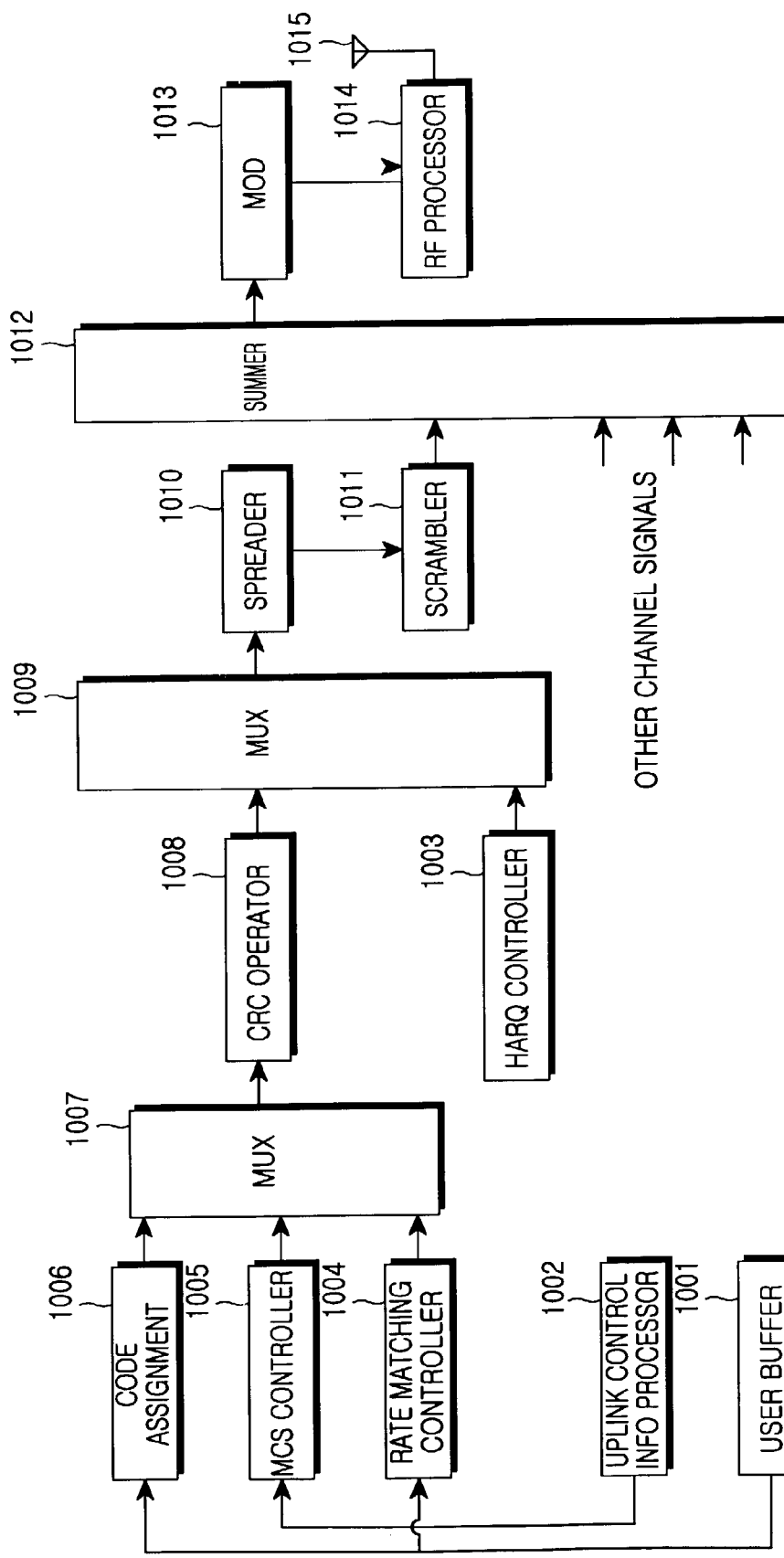
FIG. 10 is a block diagram illustrating a structure of a transmitter for an HSDPA communication system according to an embodiment of the present invention.

FIG. 10 is a block diagram illustrating a structure of a transmitter for an HSDPA communication system according to an embodiment of the present invention. Referring to FIG. 10, before transmitting user data over a high-speed downlink shared channel, a Node B assigns the number of codes to be assigned to the user data through a code assigner 1006, assigns an MCS level to be assigned to the user data through an MCS controller 1005, and provides a multiplexer (MUX) 1007 with a TBS size, or information on the number of transport blocks to be transmitted, through a rate matching controller 1004. Here, the code assigner 1006 assigns the number of codes taking into consideration a state of a user buffer 1001, or an amount of user data stored in the user buffer 1001, and the rate matching controller 1004 determines the number of transport blocks to be transmitted, depending on an amount of user data stored in the user buffer 1001. The MCS controller 1005 determines an MCS level taking into consideration channel quality information from an uplink control information processor 1002 which processes uplink control information transmitted by a corresponding UE.

Figure 1:
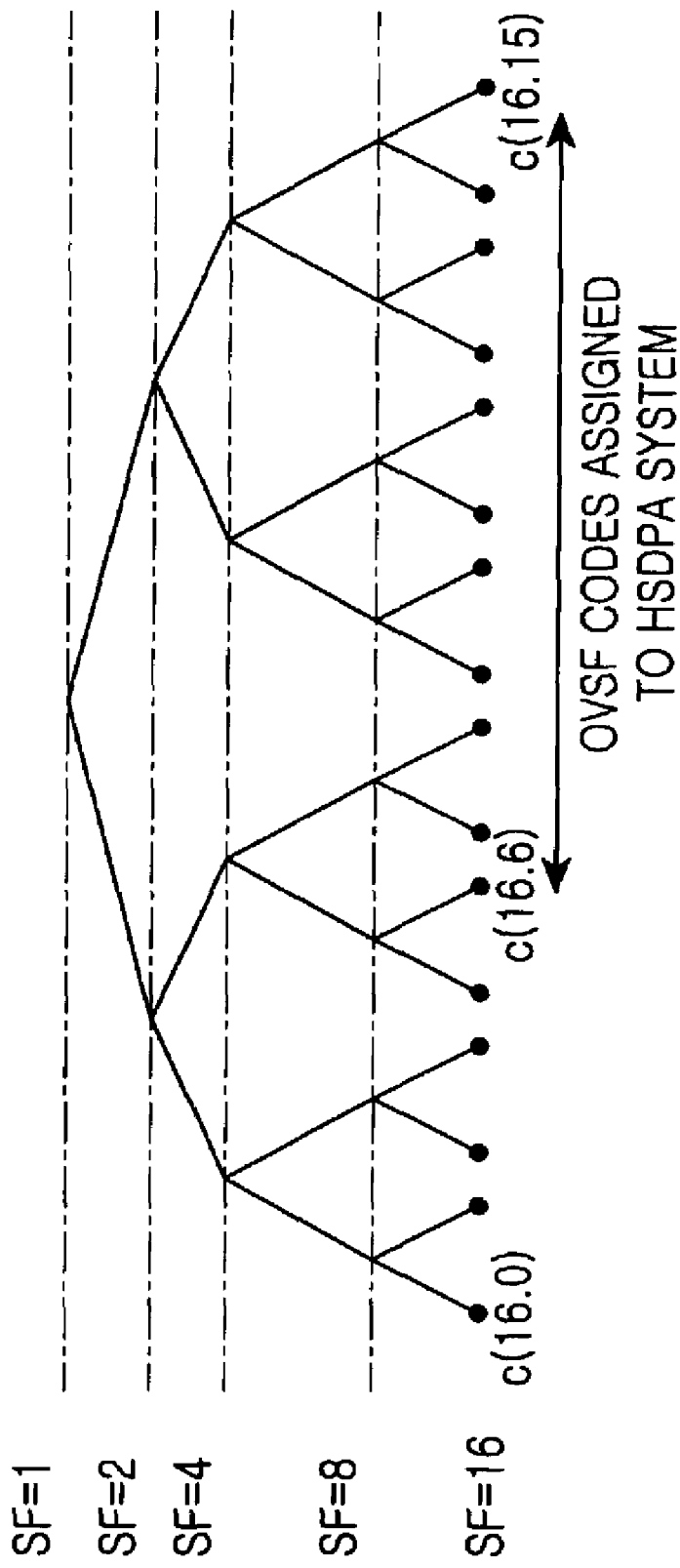
FIG. 1 illustrates an exemplary method of assigning OVSF codes in a general HSDPA communication system.
Figure 2:
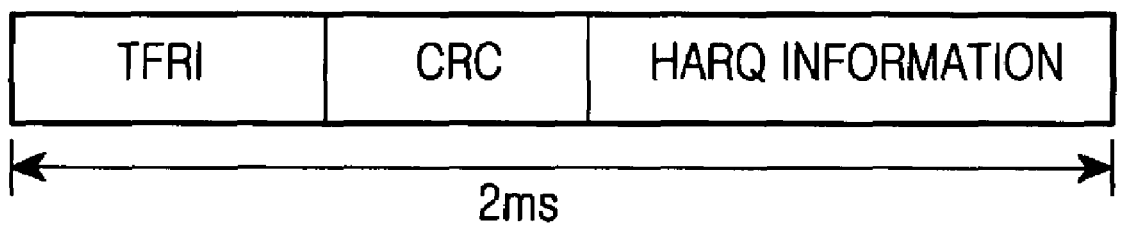
FIG. 2 illustrates a structure of a shared control channel in a common HSDPA communication system.

The multiplexer 1007 generates a bit stream in accordance with a slot format by multiplexing information provided from the rate matching controller 1004, the MCS controller 1005 and the code assigner 1006, and provides the generated bit stream to a CRC operator 1008. The CRC operator 1008 inserts CRC into the bit stream output from the multiplexer 1007, and provides the CRC-inserted bit stream to a multiplexer 1009. The multiplexer 1009 generates a bit stream in accordance with the slot format of the shared control channel illustrated in FIG. 2 by multiplexing the CRC-inserted bit stream output from the CRC operator 1008 with HARQ (Hybrid Automatic Retransmission Request) information provided from an HARQ controller (1003), and provides its output to a spreader 1010. The spreader 1010 spreads a signal output from the multiplexer 1009 with a preset spreading code, and provides the spread signal to a scrambler 1011. The scrambler 1011 scrambles the spread signal output from the spreader 1010 with a preset scrambling code, and provides the scrambled signal to a summer 1012.

The summer 1012 sums up the scrambled signal output from the scrambler 1011 and signals on the remaining channels except the shared control channel, e.g., dedicated physical channels, and provides the summed signal to a modulator 1013. The modulator 1013 modulates the summed signal output from the summer 1012 by preset modulation, and provides the modulated signal to an RF (Radio Frequency) processor 1014. The RF processor 1014 up-converts the modulated signal output from the modulator 1013 into an RF signal, and transmits the RF signal through an antenna 1015.

Next, a structure of a receiver according to an embodiment of the present invention will be described with reference to FIG. 11.

Figure 11:
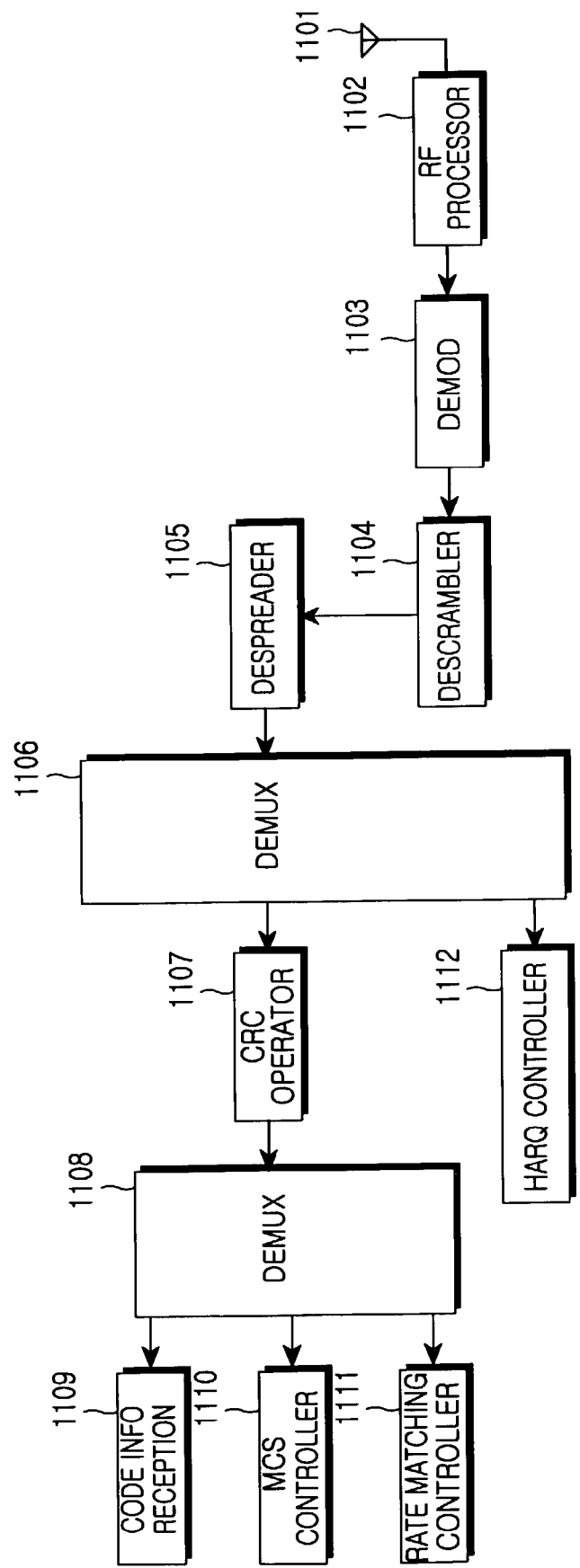
FIG. 11 is a block diagram illustrating a structure of a receiver for an HSDPA communication system according to an embodiment of the present invention.

FIG. 11 is a block diagram illustrating a structure of a receiver for an HSDPA communication system according to an embodiment of the present invention. Referring to FIG. 11, an RF signal received through an antenna 1101 is converted into a baseband signal by an RF processor 1102, and then applied to a demodulator 1103. The demodulator 1103 demodulates the baseband signal output from the RF processor 1102 by a demodulation technique corresponding to the modulation technique used in the transmitter, and provides the demodulated signal to a descrambler 1104. The descrambler 1104 descrambles the demodulated signal output from the demodulator 1103, and provides the descrambled signal to a despreader 1105. The despreader 1105 despreads the descrambled signal output from the descrambler 1104, and provides the despread signal to a demultiplexer (DEMUX) 1106.

The demultiplexer 1106 demultiplexes the despread signal output from the despreader 1105 into TFRI field, CRC field and HARQ field, and provides the HARQ field to an HARQ controller 1112 and the remaining TFRI field and CRC field to a CRC operator 1107. The CRC operator 1107 performs a CRC operation on a signal output from the demultiplexer 1106, and provides its output to a demultiplexer 1108. The demultiplexer 1108 demultiplexes a signal output from the CRC operator 1107 into code information, MCS level information and rate matching parameter, and provides the code information to a code information reception block 1109, the MCS level information to an MCS controller 1110, and the rate matching parameter to a rate matching controller 1111.

The transmitter and the receiver of FIGS. 10 and 11 according to the present invention are identical in structure to a transmitter and a receiver for the general HSDPA communication system. However, the rate matching controller 1004 in the transmitter and the rate matching controller 1111 in the receiver operate in a different way according to first to third embodiments.

Next, an operation of the rate matching controller 1004 in the transmitter will be separately described with reference to the conventional method and the first to third embodiments of the present invention.

Figure 12A:
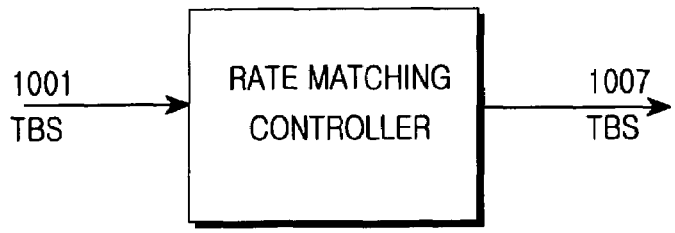
FIGS. 12A to 12D schematically illustrate an operation of the rate matching controller of FIG. 10.
Figure 12B:
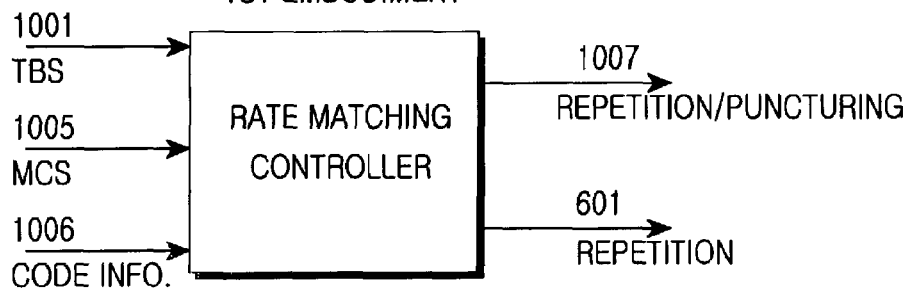
Figure 12C:
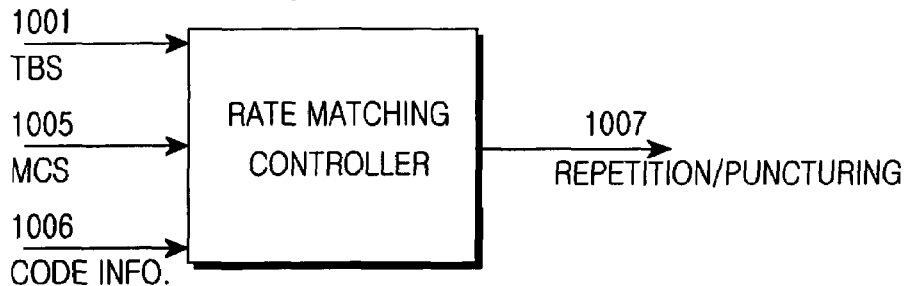
Figure 12D:
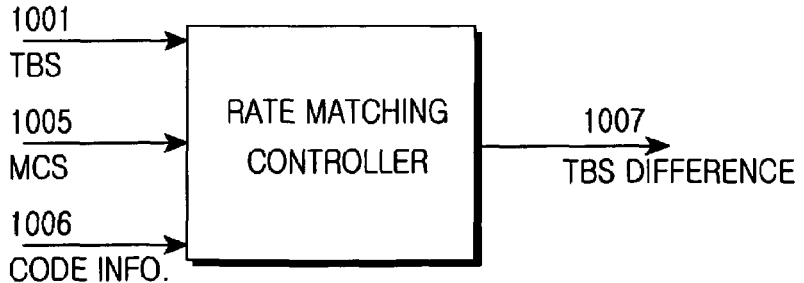

FIGS. 12B to 12D schematically illustrate an operation of the rate matching controller 1004 of FIG. 10. Before a description of FIGS. 12A to 12D, it should be noted that reference numerals in FIGS. 12A to 12D are identical to the reference numerals used in FIGS. 6 and 10. For example, reference numeral 1001 of FIG. 12A indicates that TBS is provided from the user buffer 1001.

Specifically, FIG. 12A illustrates a conceptual operation of a rate matching controller in a transmitter for a conventional HSDPA communication system. The rate matching controller receives TBS, or the number of transport blocks for user data stored in user buffer, and provides the intact TBS value to a multiplexer.

FIG. 12B illustrates a conceptual operation of the rate matching controller 1004 according to a first embodiment of the present invention. The rate matching controller 1004 receives TBS, or the number of transport blocks for the user data stored in the user buffer 1001, receives an MCS level from the MCS controller 1005 and receives the number of assigned codes from the code assigner 1006. Then, the rate matching controller 1004 calculates P_CAPA, TBS_1 and TBS_2 by substituting the received TBS for TBS_actual and using the MCS level and the number of codes. If TBS_actual is smaller than TBS_2, the rate matching controller 1004 performs repetition on the transport blocks until TBS_actual becomes equal to TBS_2 (Step 601 of FIG. 6). After the repetition, if TBS_actual is equal to TBS_2, the rate matching controller 1004 provides the multiplexer 1007 with 1-bit information indicating that an actual transport block set for the user data underwent repetition. However, if TBS_actual is equal to TBS_1, the rate matching controller 1004 provides the multiplexer 1007 with 1-bit information indicating that an actual transport block set for the user data underwent puncturing.

FIG. 12C illustrates a conceptual operation of the rate matching controller 1004 according to a second embodiment of the present invention. The rate matching controller 1004 receives TBS, or the number of transport blocks for the user data stored in the user buffer 1001, receives an MCS level from the MCS controller 1005 and receives the number of assigned codes from the code assigner 1006. Then, the rate matching controller 1004 calculates P_ACAPA_target by substituting the received TBS for TBS_actual, and calculates P_ACAPA based on the MCS level and the number of codes. If P_ACAPA_target is larger than P_ACAPA, the rate matching controller 1004 provides the multiplexer 1007 with 1-bit information indicating puncturing. If, however, P_ACAPA_target is smaller than P_ACAPA, the rate matching controller 1004 provides the multiplexer 1007 with 1-bit information indicating repetition.

FIG. 12D illustrates a conceptual operation of the rate matching controller 1004 according to a third embodiment of the present invention. The rate matching controller 1004 receives TBS, or the number of transport blocks for the user data stored in the user buffer 1001, receives an MCS level from the MCS controller 1005 and receives the number of assigned codes from the code assigner 1006. Then, the rate matching controller 1004 calculates TBS_MAX_WOF(X−1, Y) by substituting the received TBS for TBS_actual and using the MCS level and the number of codes. Here, X denotes the number of codes and Y denotes the MCS level. The rate matching controller 1004 calculates a TBS difference value Value_TBS to be provided to the multiplexer 1007 based on the calculated TBS_MAX_WOF(X−1,Y) in accordance with the following formula.

$$Value\_TBS = TBS\_actual - TBS\_MAX\_WOF(X-1,Y)$$

Next, an operation of the rate matching controller 1111 in the receiver will be separately described with reference to the conventional method and the first to third embodiments of the present invention.

Figure 13A:
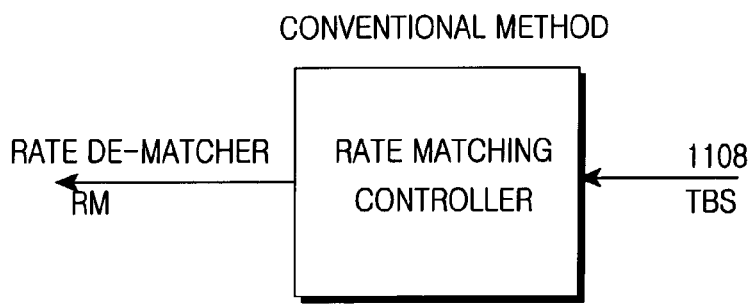
FIGS. 13A to 13D schematically illustrate an operation of the rate matching controller of FIG. 11.
Figure 13B:
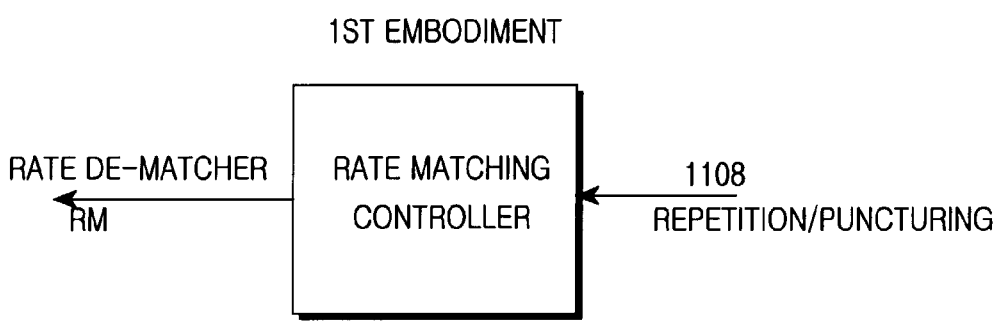
Figure 13C:
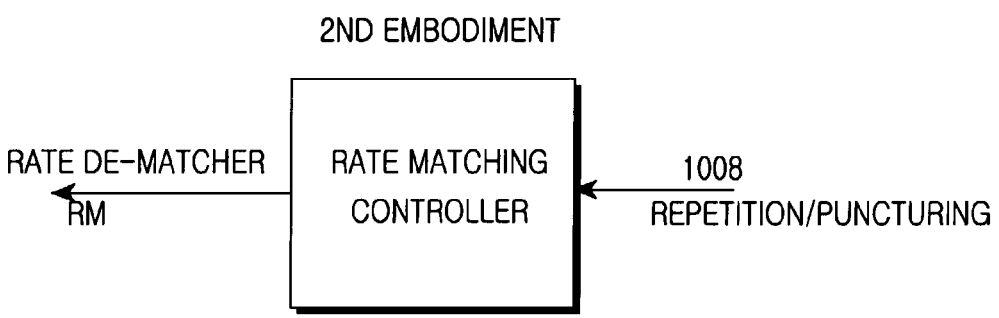
Figure 13D:
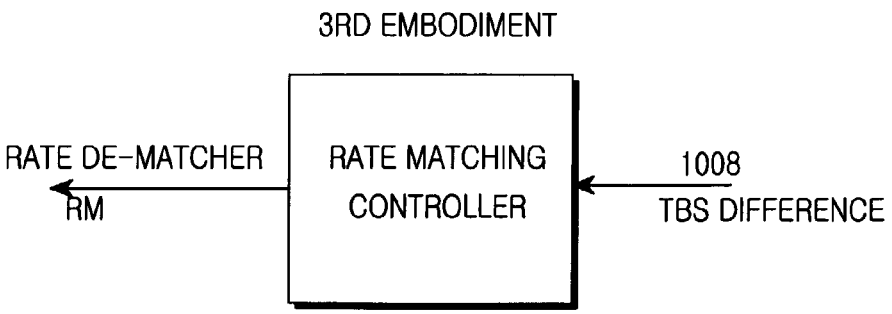

FIGS. 13B to 13D schematically illustrate an operation of the rate matching controller 1111 of FIG. 11. Before a description of FIGS. 13A to 13D, it should be noted that reference numerals in FIGS. 13A to 13D are identical to the reference numerals used in FIG. 11. For example, reference numeral 1108 of FIG. 13A indicates that TBS is provided from the demultiplexer 1008.

Specifically, FIG. 13A illustrates a conceptual operation of a rate matching controller in a receiver for a conventional HSDPA communication system. The rate matching controller calculates a rate matching value RM based on the received TBS value, and provides the calculated rate matching value to a rate de-matcher (not shown) of the receiver thus to correct the rate matched portion. Here, the rate matching value RM is calculated by $$RM = P\_ACAPA - TBS * TB\_Size$$

FIG. 13B illustrates a conceptual operation of the rate matching controller 1111 according to a first embodiment of the present invention. The rate matching controller 1111 calculates the rate matching value RM based on the values provided from the demultiplexer 1008, and provides the calculated rate matching value RM to the rate de-matcher thus to correct the rate matched portion. Here, the rate matching value RM according to the first embodiment of the present invention is calculated by $$RM = P\_ACAPA - TBS\_1 * TB\_Size \text{ if repetition}$$

$$RM = P\_ACAPA - TBS\_2 * TB\_Size \text{ if puncturing}$$

$$TBS\_1 = RU(TBS\_estimated), TBS\_2 = RD(TBS\_estimated)$$

$$TBS\_estimated = P\_ACAPA / TB\_Size$$

FIG. 13C illustrates a conceptual operation of the rate matching controller 1111 according to a second embodiment of the present invention. The rate matching controller 1111 calculates the rate matching value RM based on the values provided from the demultiplexer 1008, and provides the calculated rate matching value RM to the rate de-matcher thus to correct the rate matched portion. Here, the rate matching value RM according to the second embodiment of the present invention is calculated by $$RM=P\_ACAPA-TBS\_1*TB\_Size \text{ if repetition}$$

$$RM=P\_ACAPA-TBS\_2*TB\_Size \text{ if puncturing}$$

$$TBS\_1=RU(TBS\_estimated), TBS\_2=RD(TBS\_estimated)$$

$$TBS\_estimated=P\_ACAPA/TB\_Size$$

FIG. 13D illustrates a conceptual operation of the rate matching controller 1111 according to a third embodiment of the present invention. The rate matching controller 1111 calculates the rate matching value RM based on the values provided from the demultiplexer 1008, and provides the calculated rate matching value RM to the rate de-matcher thus to correct the rate matched portion. The rate matching value RM according to the third embodiment of the present invention is calculated by $$RM=P\_ACAPA-TBS\_actual*TB\_Size$$

$$TBS\_actual=Value\_TBS+TBS\_MAX\_WOF(X-1,Y)$$

As described above, the present invention reduces a size of a field used to transmit control information over a shared control channel, especially such control information as TBS size information in an HSDPA communication system according to the present invention, thereby increasing efficiency of downlink channel resources. Further, in the HSDPA communication system, the present invention transmits TBS size information to a UE over a shared control channel with a single bit, thereby increasing transmission efficiency of TBS size information.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting TBS (Transport Block Set) information to a UE (User Equipment) in a high-speed packet communication system, comprising the steps of:
   determining at least one modulation order among a plurality of modulation orders and at least one code among a plurality of codes;
   determining a number of radio frame data bits based on the at least one determined modulation order and a number of the at least one determined codes;
   comparing a number of coded bits for a user data with the number of radio frame data bits;
   setting a flag indicating a repetition if the number of coded bits for a user data is less than the number of radio frame data bits;
   setting a flag indicating a puncturing if the number of coded bits for a user data is greater than the number of radio frame data bits; and
   transmitting the TBS information including the flag.

2. The method of claim 1, wherein an interval of the flag is equal to a unit of transport block.

3. A method for transmitting TBS (Transport Block Set) information to a UE (User Equipment), comprising the steps of:
   determining a first number of coded bits based on a minimum modulation order and one code; determining at least one modulation order among a plurality of modulation orders and at least one code among a plurality of codes;
   determining a second number of coded bits based on the at least one determined modulation order and the at least one number of the determined codes; and
   comparing the second number of coded bits with a product of the determined first number of coded bits; and
   re-determining a modulation order having a number of radio frame data bits and the plurality of codes by the comparing-, both numbers being most approximate to the product of the determined first number of coded bits.

4. The method of claim 3, wherein a number of transport blocks constituting the TBS is determined using the determined first number of coded bits.

5. A method for transmitting TBS (Transport Block Set) information to a UE (User Equipment), comprising the steps of:
   determining at least one modulation order among a plurality of modulation orders and at least one code among a plurality of codes;
   determining a first number of information bits that can be transmitted with the at least one modulation order and a number of the determined codes;
   determining a second number of information bits that can be transmitted with the determined modulation order and the number of the determined codes minus one; and
   determining a third number of transport blocks that can be transmitted with the first number of information bits, determining a fourth number of transport blocks that can be transmitted with the second number of information bits, and then transmitting a difference between the third number of transport blocks and the fourth number of transport blocks.

6. The method of claim 5, wherein the third number of transport blocks is equal to a value determined by rounding down a value determined by dividing the first number of information bits by a given number of bits constituting the transport block.

7. A method for receiving TBS (Transport Block Set) information in a high-speed packet communication system in which a Node B separates transmission information bits into a plurality of transport blocks each having a first number of bits, transmits a TBS including a stream of the transport blocks and transmits information on the TBS to a UE (User Equipment) without transmitting TBS size information indicating the number of the transport blocks, comprising the steps of:
   receiving over a downlink shared channel a modulation order assigned to the TBS, the number of codes assigned to the TBS, and a repetition/puncturing flag indicating whether the TBS underwent repetition or puncturing;
   determining a second number of information bits that can be transmitted with the assigned modulation order and a number of the assigned codes;
   calculating a third number of transport blocks by rounding up a valued determined by dividing the second number of information bits by the first number of bits, and calculating a fourth number of transport blocks by rounding down a the value determined by dividing the second number of information bits by the first number of bits;

if the received repetition/puncturing flag indicates that the TBS underwent repetition, determining a size of the TBS as the third number of transport blocks, and determining a rate matching value by subtracting a product of the third number of transport blocks and the first number of bits from the second number of information bits; and if the received repetition/puncturing flag indicates that the TBS underwent puncturing, determining the size of the TBS as the fourth number of transport blocks, and determining a rate matching value by subtracting a product of the fourth number of transport blocks and the first number of bits from the second number of information bits.

8. A method for receiving TBS (Transport Block Set) information in a high-speed packet communication system in which a Node B separates transmission information bits into a plurality of transport blocks each having a first number of bits, transmits a TBS including a stream of the transport blocks and transmits the TBS information to a UE (User Equipment) without transmitting a TBS size information indicating a number of the transport blocks, comprising the steps of:

receiving over a downlink shared channel a modulation order assigned to the TBS, a number of codes assigned to the TBS, and receiving a difference between a second number of transport blocks that can be transmitted with the assigned modulation order and the number of the assigned codes, and a third number of transport blocks that can be transmitted with the assigned modulation order and the number of the assigned codes minus one;

determining a fourth number of information bits that can be transmitted with the assigned modulation order and the number of the assigned codes; and determining a rate matching value by subtracting a fifth number determined by adding the difference to the third number of transport blocks and a sixth number determined by multiplying the fifth number by the first number of bits, from the fourth number of information bits.

9. The method of claim 8, wherein the fourth number of transport blocks is determined by rounding up a value determined by dividing the second number of information bits by a given number of bits constituting the transport block.

10. An apparatus for transmitting TBS (Transport Block Set) information to a UE (User Equipment) without transmitting TBS size information indicating a number of transport blocks in a high-speed packet communication system which separates transmission information bits into a plurality of transport blocks each having a given number of bits and transmits a TBS including a stream of the transport blocks, comprising:

an MCS (Modulation and Coding Scheme) level controller for assigning one MCS level among a plurality of MCS levels according to channel quality information received from the UE;

a code assigner for assigning at least one code among a plurality of codes according to a number of the transmission information bits;

a rate matching controller for determining a number of transmittable information bits based on the determined MCS level and the number of the determined codes; and a transmitter for transmitting the assigned MCS level, the at least one assigned codes, and one of a repetition flag and a puncturing flag, over a downlink, wherein if a number of coded bits for the transmission information bits is less than the number of transmittable information bits, repeating some of the coded bits at regular intervals and assigning a repetition flag indicting the repetition, and if the number of coded bits is greater than or equal to the number of transmittable information bits, puncturing some of the coded bits at regular intervals and assigning a puncturing flag for indicating the puncturing of some of the coded bits.

11. The apparatus of claim 10, wherein an interval of the flag is equal to a unit of a transport block.

12. The method of claim 10, wherein a second number of transport blocks is determined by rounding up a value determined by dividing a fourth number of information bits by a first number of bits.

13. The method of claim 10, wherein a third number of transport blocks is determined by rounding down a valued determined by dividing a seventh number of information bits that can be transmitted with the assigned MCS level and a number of the assigned codes minus one, by the first number of bits.

14. An apparatus for receiving TBS (Transport Block Set) information in a high-speed packet communication system, in which a Node B separates transmission information bits into a plurality of transport blocks each having a first number of bits, transmits a TBS including a stream of the transport blocks and transmits the TBS to a UE (User Equipment) without transmitting TBS size information indicating the number of transport blocks, comprising:

a receiver for receiving a downlink shared channel signal, and detecting from the downlink shared channel signal an MCS (Modulation and Coding Scheme) level assigned to the TBS, the number of codes assigned to the TBS, and a repetition/puncturing flag indicating whether the TBS underwent repetition or puncturing; and a rate matching controller for determining a second number of information bits that can be transmitted with the assigned MCS level and the number of the assigned codes, calculating a third number of transport blocks by rounding up a value determined by dividing the second number of information bits by the first number of bits, calculating a fourth number of transport blocks by rounding down a value determined by dividing the second number of information bits by the first number of bits, wherein if the received repetition/puncturing flag indicates that the TBS underwent repetition, determining a size of the TBS as the third number of transport blocks and determining a rate matching value by subtracting a product of the third number of transport blocks and the first number of bits from the second number of information bits, and if the received repetition/puncturing flag indicates that the TBS underwent puncturing, determining the size of the TBS as the fourth number of transport blocks and determining a rate matching value by subtracting a product of the fourth number of transport blocks and the first number of bits from the second number of information bits.

15. An apparatus for receiving TBS (Transport Block Set) information in a high-speed packet communication system, in which a Node B separates transmission information bits into a plurality of transport blocks each having a first number of bits, transmits a TBS including a stream of the transport blocks and transmits TBS information to a UE (User Equipment) without transmitting TBS size information indicating a number of transport blocks, comprising:

a receiver for receiving a downlink shared channel signal, and detecting from the downlink shared channel signal an MCS (Modulation and Coding Scheme) level assigned to the TBS, the number of codes assigned to the TBS, and for receiving a difference between a second number of transport blocks that can be transmitted with the assigned MCS level and the number of the assigned codes and a third number of transport blocks that can be transmitted with the assigned MCS level and the number of the assigned codes minus one; and a rate matching controller for determining a fourth number of information bits that can be transmitted with the assigned MCS level and the number of the assigned codes, and determining a rate matching value by subtracting a fifth number determined by adding the difference to the third number of transport blocks and a sixth number determined by multiplying the fifth number by the first number of bits, from the fourth number of information bits.

16. The apparatus of claim 15, wherein the second number of transport blocks is determined by rounding up a value determined by dividing the fourth number of information bits by the first number of bits.

17. The apparatus of claim 15, wherein the third number of transport blocks is determined by rounding down a valued determined by dividing a seventh number of information bits that can be transmitted with the assigned MCS level and the number of the assigned codes minus one, by the first number of bits.

* * * * *